United States Patent
Yeh et al.

(10) Patent No.: US 10,688,598 B2
(45) Date of Patent: Jun. 23, 2020

(54) PORTABLE LASER ENGRAVING/CUTTING APPARATUS

(71) Applicant: MUHERZ LIMITED, New Taipei (TW)

(72) Inventors: Ren-Yu Yeh, New Taipei (TW); Cheng-Lung Chen, New Taipei (TW); Ching-Ting Lin, New Taipei (TW)

(73) Assignee: MUHERZ LIMITED, New Taipei (TW)

( * ) Notice: Subject to any disclaimer, the term of this patent is extended or adjusted under 35 U.S.C. 154(b) by 349 days.

(21) Appl. No.: 15/864,513

(22) Filed: Jan. 8, 2018

(65) Prior Publication Data

US 2019/0030647 A1    Jan. 31, 2019

(30) Foreign Application Priority Data

Jul. 31, 2017 (TW) .............................. 106211244 A
Oct. 24, 2017 (TW) .............................. 106215673 A

(51) Int. Cl.
*B23K 26/364* (2014.01)
*B23K 26/082* (2014.01)
*B23K 26/00* (2014.01)
*B23K 26/06* (2014.01)
*B23K 26/08* (2014.01)

(52) U.S. Cl.
CPC ........ *B23K 26/364* (2015.10); *B23K 26/0096* (2013.01); *B23K 26/0648* (2013.01); *B23K 26/082* (2015.10); *B23K 26/0876* (2013.01)

(58) Field of Classification Search
CPC .. B23K 26/364; B23K 26/082; B23K 26/009; B23K 26/0648; B23K 26/0876
USPC ........................................ 219/121.68, 82, 84
See application file for complete search history.

(56) References Cited

U.S. PATENT DOCUMENTS

| | | | |
|---|---|---|---|
| 3,717,772 A | 2/1973 | Engman | |
| 5,048,904 A | 9/1991 | Montagu | |
| 7,501,601 B2 | 3/2009 | Lundberg | |
| 8,598,489 B1 * | 12/2013 | Miller | B23K 26/0096 219/121.68 |
| 8,912,465 B2 * | 12/2014 | Kuo | B23K 26/08 219/121.68 |
| 2003/0226835 A1 * | 12/2003 | Bell | B23K 26/10 219/121.78 |

* cited by examiner

*Primary Examiner* — Jennifer C Chiang
(74) *Attorney, Agent, or Firm* — Muncy, Geissler, Olds & Lowe, P.C.

(57) ABSTRACT

A portable laser engraving/cutting apparatus includes a casing, a working laser source, a lens unit, a first axis galvanometric unit and a second axis galvanometric unit. The working laser source, the lens unit, the first axis galvanometric unit and the second axis galvanometric unit all are installed within the casing to implement the portable laser engraving cutting apparatus with a small volume.

16 Claims, 10 Drawing Sheets

PORTABLE LASER ENGRAVING/CUTTING APPARATUS

CROSS-REFERENCE TO RELATED APPLICATION

This utility application claims priorities to Taiwan Application Serial Number 106211244, filed Jul. 31, 2017, and Taiwan Application Serial Number 106215673, filed Oct. 24, 2017, which are incorporated herein by reference.

BACKGROUND OF THE INVENTION

1. Field of the Invention

The invention relates to a portable laser engraving/cutting apparatus, and in particular, to a portable laser engraving/cutting apparatus having a volume, and capable of maintaining high power output without the need of fan cooling. It is slightly difficult for aligning the center of the portable laser engraving/cutting apparatus according to the invention during assembly. The portable laser engraving/cutting apparatus according to the invention has low distortion in laser scanning, and can preview the working path to provide convenience for general users using the portable laser engraving/cutting apparatus according to the invention.

2. Description of the Prior Art

As for laser engraving/cutting apparatuses, there are prior arts using XY axis gantry platform. However, the laser engraving/cutting apparatuses of the prior arts have huge volumes. The length, width and height of the workpiece to be processed is limited by the size of the gantry platform of the laser engraving/cutting apparatuses of the prior art. The laser engraving/cutting apparatuses of the prior art can only process the plates or small parts put on the horizontal surface of the gantry platform, and can only process the workpieces slowly along X-axis and Y-axis direction of the gantry platform. Users cannot previously preview the laser working path relating to the workpiece to be processed by the laser engraving/cutting apparatuses of the prior art. The laser engraving/cutting apparatuses of the prior art need fixtures and mechanical coordinate positioning to accurately process at the correct positions of the workpieces. As for aforesaid prior arts, please refer to the U.S. Pat. No. 7,501,601.

The laser engraving/cutting apparatus of another prior art uses galvanometric scanning system for laser engraving or cutting. The galvanometric scanning system moves rapidly, and can move low power laser coaxially. Before laser working, the processing area can be previewed to ensure the correct worked positions. However, the general galvanometric scanning system needs an F-theta lens added between a galvanometer and a workpiece to focus laser beam on the working surface of the workpiece, and thus, the laser working range of the laser engraving/cutting apparatus work is limited by the F-theta lens. Moreover, the control program executed in the laser engraving/cutting apparatus needs function of calibration for the pincushion distortion caused by two axis galvanometer and the barrel distortion caused by the F-theta lens. In addition, the general galvanometric scanning system occupies huge volume. As for the laser engraving/cutting apparatus using the galvanometric scanning system, please refer to U.S. Pat. No. 3,717,772 and U.S. Pat. No. 5,048,904.

In addition, the working laser source used in the laser engraving/cutting apparatus of the prior art includes complex members to result in poor efficiency of heat dissipation. Thus, the high power working laser source (with power higher than 400 mW) used in the laser engraving/cutting apparatus of the prior art needs a large heat-dissipating fin and a fan to maintain normal operation. It is very difficult for aligning the center of the assembled working laser source with the center of the galvanometric scanning system, and thus, it is more likely to cause distortion for the laser engraving/cutting apparatus of the prior art.

SUMMARY OF THE INVENTION

Accordingly, one scope of the invention is to provide a portable laser engraving/cutting apparatus. The portable laser engraving/cutting apparatus according to the invention is small in volume, and can maintain high power output without the need of fan cooling. It is slightly difficult for aligning the center of the portable laser engraving/cutting apparatus according to the invention during assembly. The portable laser engraving/cutting apparatus according to the invention has low distortion in laser scanning, and can preview the working path to provide convenience for general users using the portable laser engraving/cutting apparatus according to the invention.

A portable laser engraving/cutting apparatus according to a preferred embodiment of the invention is used to engrave or cut a pattern on a working surface of a workpiece. The portable laser engraving/cutting apparatus according to the preferred embodiment of the invention includes a casing, a controlling circuit, a working laser source, a first axis galvanometric unit, a lens unit, and a second axis galvanometric unit. The casing includes a front panel having a window and an inner wall. The controlling circuit is fixed in the casing, and is for receiving an information associated with the pattern. The working laser source is fixed on the inner wall of the front panel, and electrically connected to the controlling circuit. The working laser source is controlled by the controlling circuit to emit a laser beam. The first axis galvanometric unit is fixed on the inner wall of the front panel, and electrically connected to the controlling circuit. The first axis galvanometric unit includes a first reflector. The lens unit is fixed on the inner wall of the front panel, and electrically connected to the controlling circuit. The lens unit is capable of moving with respect to the working laser source, or moving together with the working laser source with respect to the first axis galvanometric unit. The second axis galvanometric unit is fixed on the inner wall of the front panel, and electrically connected to the controlling circuit. The second axis galvanometric unit includes a second reflector. The controlling circuit adjusts, according to the information associated with the pattern, a distance of the lens unit with respect to the working laser source or the first axis galvanometric unit, adjust a first target rotation angle of the first reflector and a second target rotation angle of the second reflector to control a position and an energy of the laser beam passing through the window and onto the working surface.

In one embodiment, the first axis galvanometric unit includes a first motor. The first motor is operatively connected to the first reflector. The second axis galvanometric unit includes a second motor. The second motor is operatively connected to the second reflector.

In one embodiment, the controlling circuit includes a micro-processor, the first motor controller, a second motor controller and a wireless communication module. The micro-processor is respectively connected to the working laser source, the first motor controller, the motor controller, the lens unit and the wireless communication module. The first motor controller is electrically connected to the first motor. The second motor controller is electrically connected to the second motor. The micro-processor is capable of communicating with a mobile data processing apparatus through the wireless communication module. The micro-processor selectively receives the information associated with the pattern transmitted from the mobile data processing apparatus through the wireless communication module, and respectively transmits a control signal to the working laser source, the first motor controller, the second motor controller and the lens unit in accordance with the information associated with the pattern.

In one embodiment, the wireless communication module can confirm to a Wi-Fi protocol, a WiMAX protocol, IEEE 802.11 series protocols, a 3G network protocol, a 4G network protocol, a 5G network protocol, an FISPA network protocol, an LTE network protocol, a Bluetooth protocol, or other commercial wireless communication protocols.

Further, the portable laser engraving /cutting apparatus according to the preferred embodiment of the invention also includes a connection port and a memory card slot. The connection port and the memory card slot both are fixed on the casing, and respectively electrically connected to the micro-processor. The connection port provides a physical connection for the mobile data processing apparatus. The memory card slot receives insertion of a memory card. The micro-processor selectively receives the information associated with the pattern transmitted from the mobile data processing apparatus through the wireless communication module or the connection port, or receives the information associated with the pattern stored in the memory card inserted in the memory card slot.

In one embodiment, the mobile data processing apparatus executes an application. A user operates the mobile data processing apparatus to control the micro-processor by use of the application.

In one embodiment, the first axis galvanometric unit also includes a first magnet fixed on a first transmission axis of the first motor. The second axis galvanometric unit also includes a second magnet fixed on a second transmission axis of the second motor. The controlling circuit also includes a first Hall device and a second Hall device. The first Hall device is electrically connected to the micro-processor, and magnetically coupled to the first magnet. The second Hall device is electrically connected to the micro-processor, and magnetically coupled to the second magnet.

The first Hall device detects a first magnetic line of the first magnet. The second Hall device detects a second magnetic line of the second magnet. The micro-processor transmits the control signal to the first motor controller and the second motor controller in accordance with the first magnetic line detected by the first Hall device and the second magnetic line detected by the second Hall device.

Further, the portable laser engraving/cutting apparatus according to the preferred embodiment of the invention also includes an accelerometer. The accelerometer is electrically connected to the micro-processor, and for detecting a distance of the casing. The micro-processor selectively turns off the working laser source in accordance with the distance detected by the accelerometer.

Further, the portable laser engraving/cutting apparatus according to the preferred embodiment of the invention also includes a thermal sensor. The thermal sensor is electrically connected to the micro-processor, and for detecting a temperature inside the casing. The micro-processor selectively turns off the working laser source in accordance with the temperature detected by the thermal sensor.

Further, the portable laser engraving/cutting apparatus according to the preferred embodiment of the invention also includes an electric current sensor. The electric current sensor is electrically connected to the micro-processor, and for detecting an electric current of the controlling circuit. The micro-processor selectively turns off the working laser source in accordance with a current alteration of the electric current detected by the electric current sensor.

Further, the portable laser engraving/cutting apparatus according to the preferred embodiment of the invention also includes a first image-capturing device. The first image-capturing device is electrically connected to the micro-processor, and for capturing an image in front of the front panel. The micro-processor selectively turns off the working laser source in accordance with an alteration of the image captured by the first image-capturing device.

Further, the portable laser engraving/cutting apparatus according to the preferred embodiment of the invention also includes a motion sensor. The motion sensor is electrically connected to the micro-processor, and for detecting a distance associated with an object locating between the window and the working surface. The micro-processor selectively turns off the working laser source in accordance with the distance detected by the motion sensor.

Further, the portable laser engraving/cutting apparatus according to the preferred embodiment of the invention also includes an invisible laser source and a second image-capturing device. The invisible laser source and the second image-capturing device are respectively electrically connected to the micro-processor. The invisible laser source is for emitting an invisible light structure to project onto the working surface. The second image-capturing device is for capturing the invisible light structure projected on the working surface. The micro-processor selectively turns off the working laser source in accordance with an alteration of the invisible light structure captured by the second image-capturing device.

Further, the portable laser engraving/cutting apparatus according to the preferred embodiment of the invention also includes a switch and an indicating unit. The switch and the indicating unit are disposed on a top of the casing, and respectively electrically connected to the micro-processor. The user operates the switch to turn on or off the portable laser engraving/cutting apparatus. The micro-processor controls the indicating unit to emit a color light in accordance with turning on or off of the switch.

In one embodiment, the casing has a screw hole formed at a bottom thereof. The screw hole provides screwing for a foot shelf.

Distinguishable from the prior arts, the portable laser engraving/cutting apparatus according to the invention is small in volume to be carried easily. The portable laser engraving/cutting apparatus according to the invention can maintain high power output without the need of fan cooling. It is slightly difficult for aligning the center of the portable laser engraving/cutting apparatus according to the invention during assembly. The portable laser engraving/cutting apparatus according to the invention has low distortion in laser scanning. Moreover, the portable laser engraving/cutting apparatus according to the invention has no limitation on working range and direction, and can process the working surface of the workpiece in any direction.

The advantage and spirit of the invention may be understood by the following recitations together with the appended drawings,

BRIEF DESCRIPTION OF THE APPENDED DRAWINGS

DETAILED DESCRIPTION OF THE INVENTION

Figure 1:
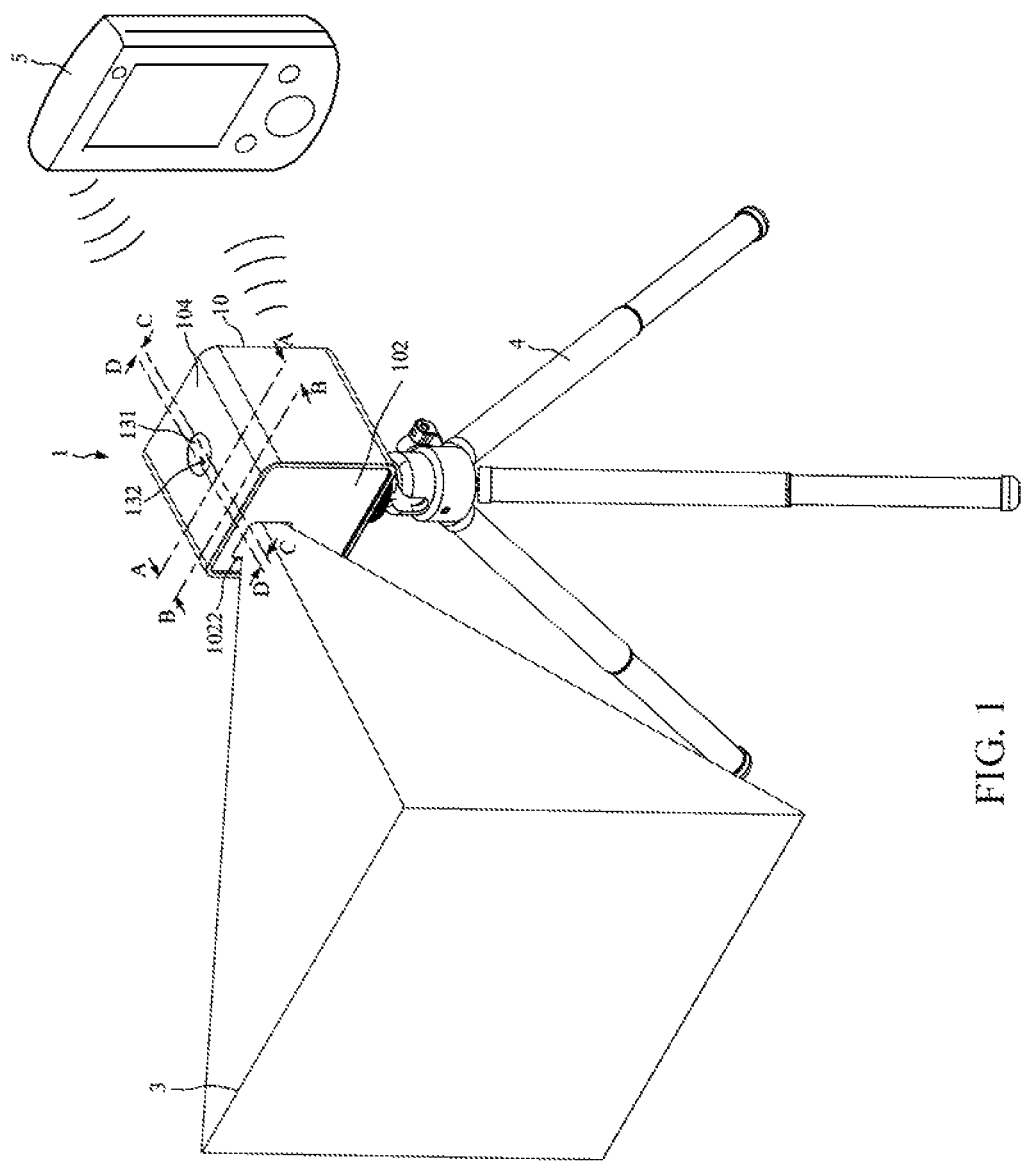
FIG. 1 is a perspective view of a portable laser engraving/cutting apparatus according to a preferred embodiment of the invention.
Figure 2:
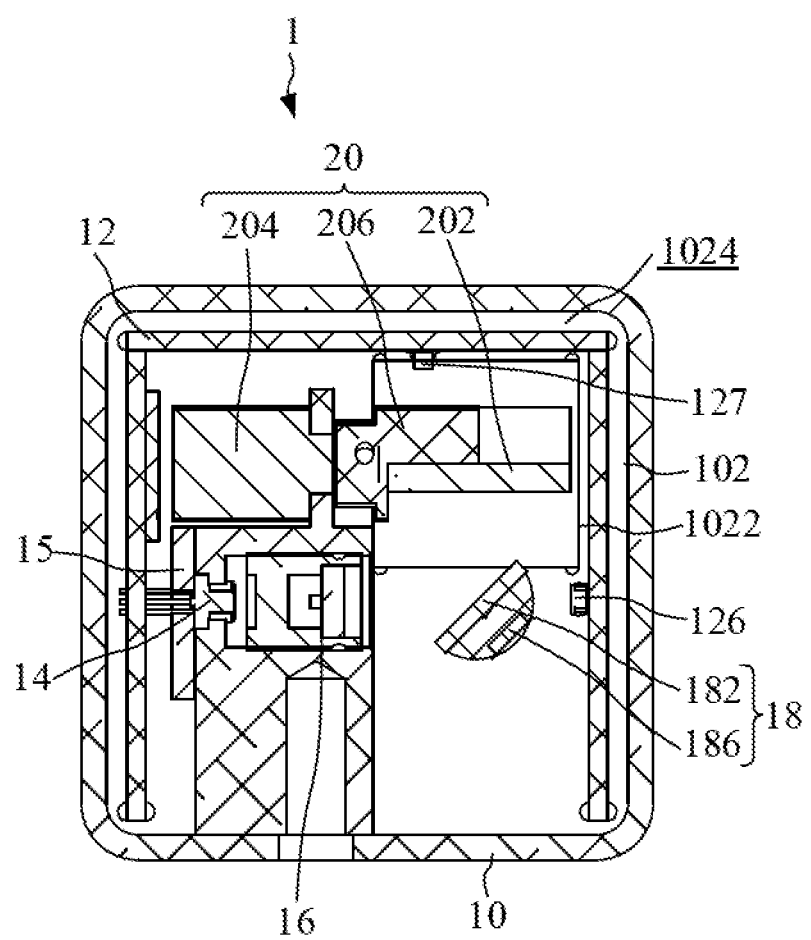
FIG. 2 is a cross sectional view of the portable laser engraving/cutting apparatus taken along the A-A line of FIG. 1.
Figure 3:
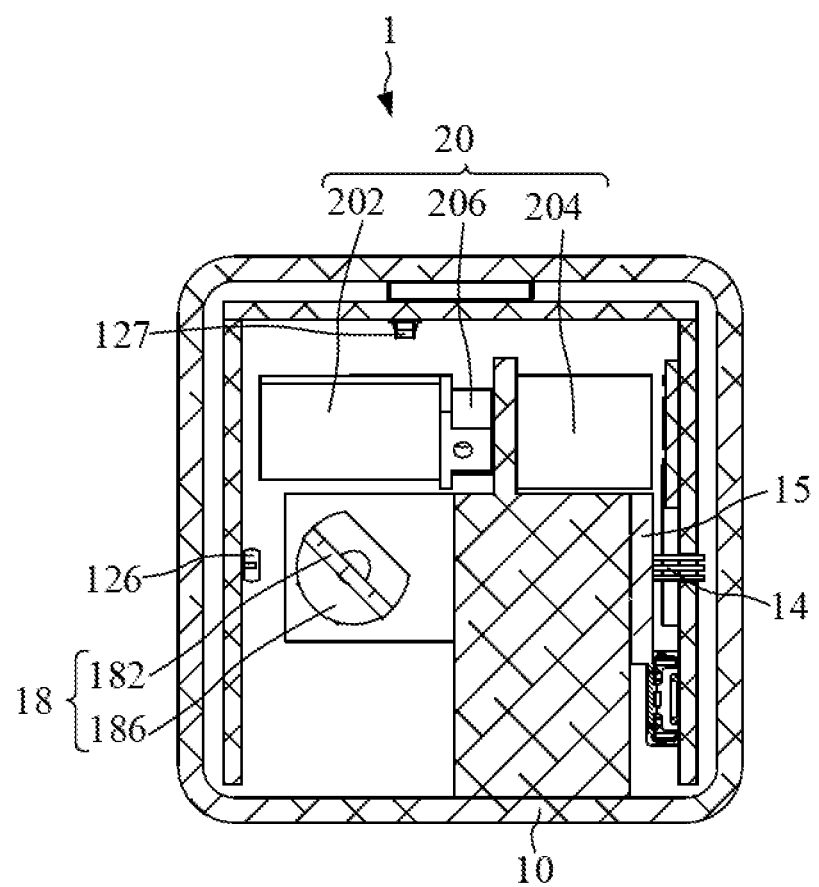
FIG. 3 is a cross sectional view of the portable laser engraving/cutting apparatus taken along the B-B line of FIG. 1.
Figure 4:
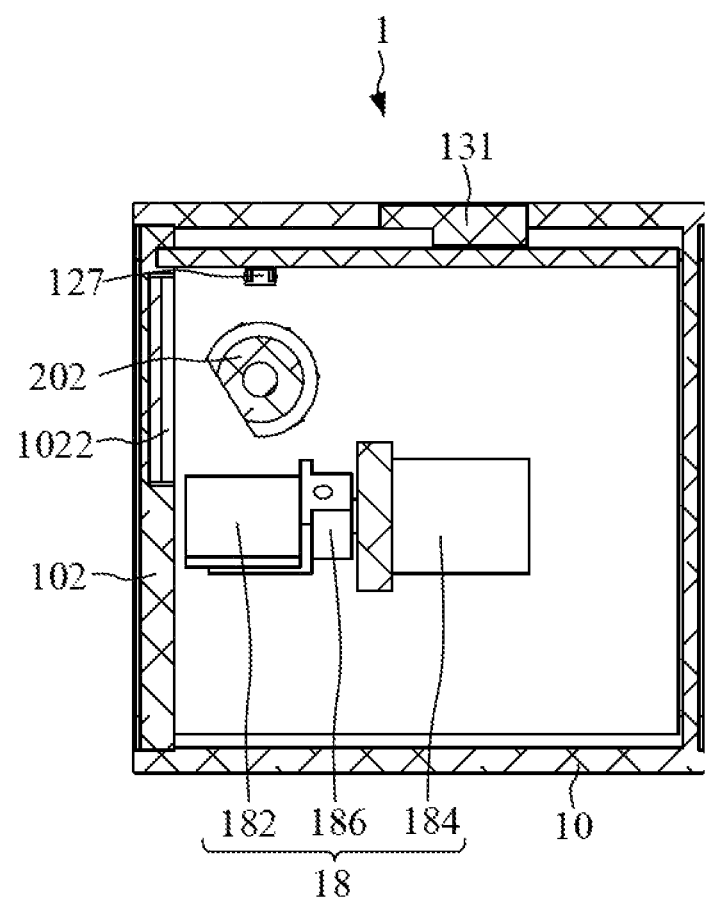
FIG. 4 is a cross sectional view of the portable laser engraving/cutting apparatus taken along the C-C line of FIG. 1.
Figure 5:
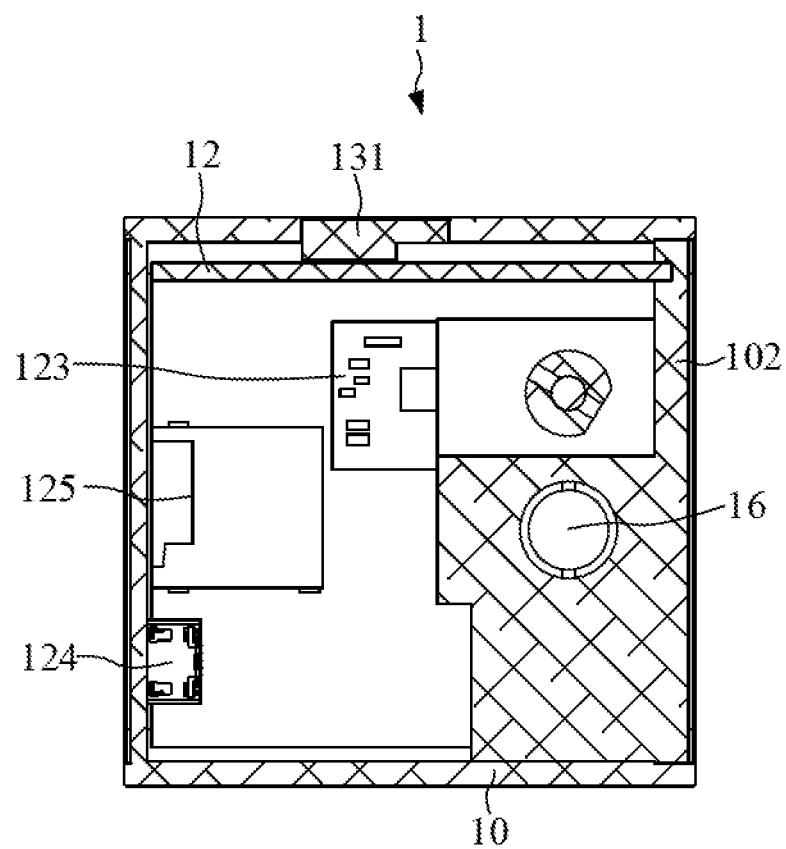
FIG. 5 is a cross sectional view of the portable laser engraving/cutting apparatus taken along the D-D line of FIG. 1.
Figure 6:
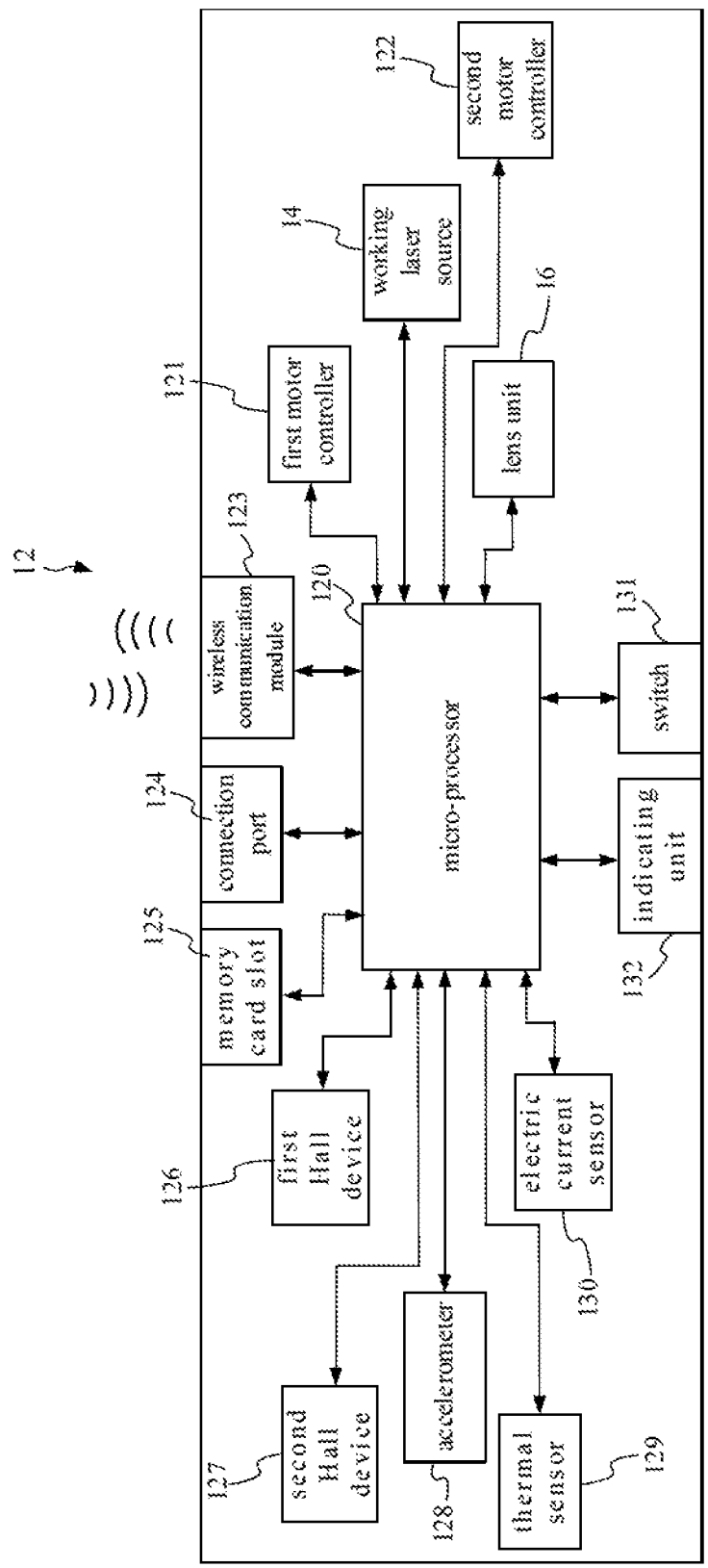
FIG. 6 is a function block diagram of the portable laser engraving/cutting apparatus according to the preferred embodiment of the invention.
Figure 7:
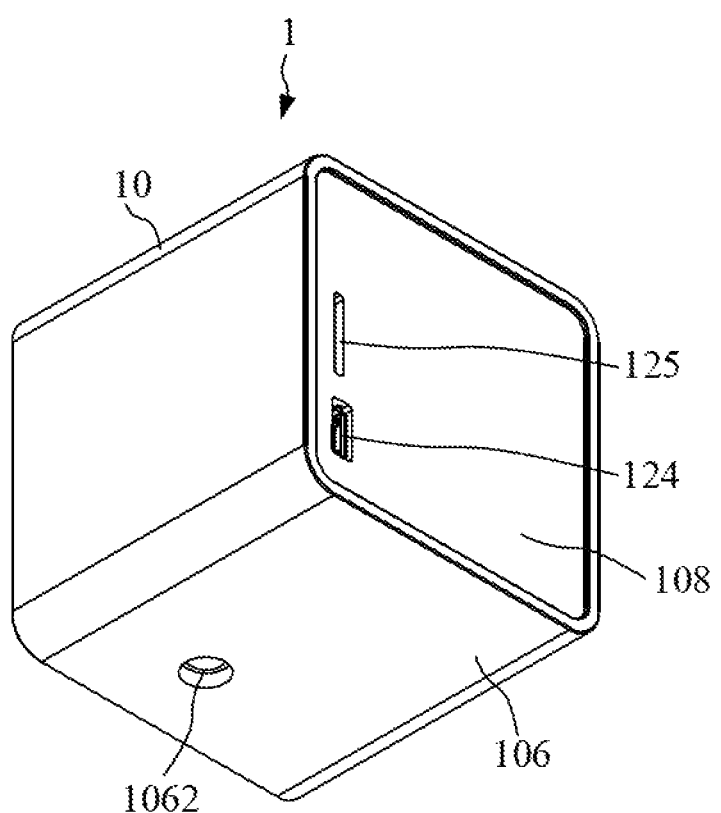
FIG. 7 is another perspective view of the portable laser engraving/cutting apparatus according to the preferred embodiment of the invention.

Referring to FIGS. 1 to 7, those drawings schematically illustrate a portable laser engraving/cutting 1 according to the preferred embodiment of the invention. FIG. 1 is a perspective view of the portable laser engraving/cutting apparatus 1 according to the preferred embodiment of the invention and a foot shelf 4 for assisting the portable laser engraving/cutting apparatus 1 in being fixed. FIG. 2 is a cross sectional view of the portable laser engraving/cutting apparatus 1 taken along the A-A line of FIG. 1. FIG. 3 is a cross sectional view of the portable laser engraving/cutting apparatus 1 taken along the B-B line of FIG. 1. FIG. 4 is a cross sectional view of the portable laser engraving/cutting apparatus 1 taken along the C-C line of FIG. 1. FIG. 5 is a cross sectional view of the portable laser engraving/cutting apparatus 1 taken along the D-D line of FIG. 1. FIG. 6 is a function block diagram of the portable laser engraving/cutting apparatus 1 according to the preferred embodiment of the invention. FIG. 7 is another perspective view of the portable laser engraving/cutting apparatus 1 according to the preferred embodiment of the invention.

The portable laser engraving/cutting apparatus 1 according to the preferred embodiment of the invention is used to engrave or cut a pattern on a working surface 3 of a workpiece (not shown in FIG. 1). In practical applications, the workpiece can be, but not limited to, a piece of paper, a piece of leather, a wood board, a bamboo piece, a polymer board, a metal sheet, etc.

As shown in FIG. 1 to FIG. 7, the portable laser engraving/cutting apparatus 1 according to the preferred embodiment of the invention includes a casing 10, a controlling circuit 12, a working laser source 14, a lens unit 16, a first axis galvanometric unit 18, and a second axis galvanometric unit 20.

The casing 10 includes a front panel 102 having a window 1022 and an inner wall 1024. The controlling circuit 12 is fixed in the casing 10, and is for receiving an information associated with the pattern.

The working laser source 14 is fixed on the inner wall 1024 of the front panel 102, and electrically connected to the controlling circuit 12. The working laser source 14 is controlled by the controlling circuit 12 to emit a laser beam. The lens unit 16 is fixed on the inner wall 1024 of the front panel 102, and electrically connected to the controlling circuit 12. The lens unit 16 includes a motor (not shown in figures). The lens unit 16 can move with respect to the working laser source 14. Alternatively, the lens unit 16 can move together with the working laser source 14 with respect to the first axis galvanometric unit 18. Thereby, the energy of the laser beam projected on the working surface 3 can be controlled. In one embodiment, the lens unit 16 includes a convex lens.

In one embodiment, the output power of the working laser source 14 has a range of from 400 mW to 3400 mW.

The first axis galvanometric unit 18 is fixed on the inner wall 1024 of the front panel 102, and electrically connected to the controlling circuit 12. The first axis galvanometric unit 18 includes a first reflector 182. The second axis galvanometric unit 20 is fixed on the inner wall 1024 of the front panel 102, and electrically connected to the controlling circuit 12. The second axis galvanometric unit 20 includes a second reflector 202. The controlling circuit 12 adjusts, according to the information associated with the pattern, a distance of the lens unit 16 with respect to the working laser source 14 or the first axis galvanometric unit 18, and adjust a first target rotation angle of the first reflector 182 and a second target rotation angle of the second reflector 202 to control a position and an energy of the laser beam passing through the window 1022 and onto the working surface 3 and further finish the pattern. The pattern can be a three-dimensional pattern.

As shown in FIG. 1, the portable laser engraving/cutting apparatus 1 according to the preferred embodiment of the invention has no limitation of the XY axis gantry platform used in the laser engraving/cutting apparatus of the prior art, and thus, can includes work the working surface 3 being several times as large as the front panel 102.

As shown in FIG. 2 and FIG. 3, the invention integrates the working laser source 14, the lens unit 16, the first axis galvanometric unit 18, the second axis galvanometric unit 20 and the controlling circuit 12 on the front panel 102 of the casing 10 to practice the small volume galvanometric scanning system using in the portable laser engraving/cutting apparatus 1 of the invention.

The working laser source 14 is directly installed on the inner wall 1024 of the front panel 102, and is adjacent to the casing 10. The heat-conducting path for the working laser source 14 is short, the heat dissipation efficiency for the working laser source 14 is high, and thus, the high-power output of the portable laser engraving/cutting apparatus 1 of the invention can be maintained without the need of fan cooling. Moreover, the influence of fan vibration can be eliminated in the portable laser engraving/cutting apparatus 1 of the invention. As shown in FIG. 2, the portable laser engraving/cutting apparatus 1 according of the invention also includes a heat-dissipating device 15. The heat-dissipating device 15 is boded with the working laser source 14, and is disposed on the casing 10 to assist the working laser source 14 in heat dissipation during operation. In one embodiment, the casing 10 can be, but not limited to, formed of a metal.

In addition, the invention installs the working laser source 14, the lens unit 16, the first axis galvanometric unit 18 and the second axis galvanometric unit 20 on the single member to reduce the difficulty of aligning the center of the portable laser engraving/cutting apparatus of the invention during assembly, and to reduce the distortion of laser scanning.

The portable laser engraving/cutting apparatus according to the preferred embodiment of the invention can preview the working path by use of the first axis galvanometric unit 18, the second axis galvanometric unit 20 and the controlling of energy of the laser beam to provide convenience for general users.

Figure 8:
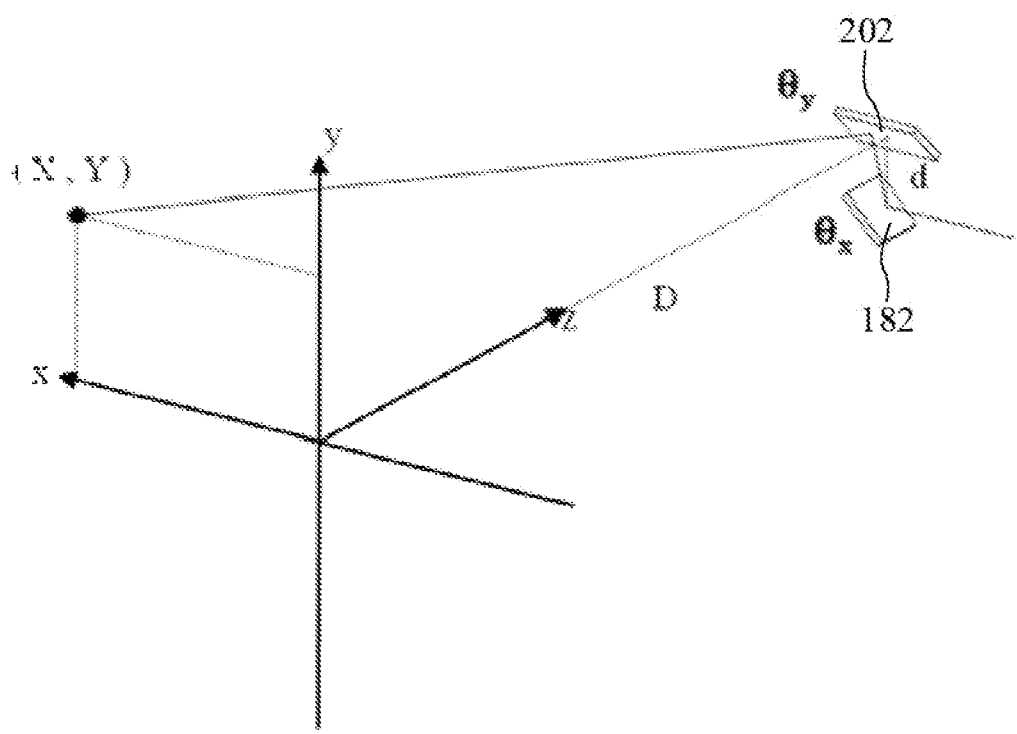
FIG. 8 is a schematic diagram illustratively showing the correction of pincushion distortion caused by a first axis galvanometric unit and a second axis galvanometric unit in the portable laser engraving/cutting apparatus according to the invention.

Referring to FIG. 8, FIG. 8 is a schematic diagram illustratively showing the correction of pincushion distortion caused by the first axis galvanometric unit 18 and the second axis galvanometric unit 20 in the portable laser engraving/cutting apparatus 1 according to the invention. The controlling circuit 12 also adjusts, according to the following function, the first target rotation angle of the first reflector 182 and the second target rotation angle of the second reflector 202 to reduce a pincushion distortion caused by the first axis galvanometric unit 18 and the second axis galvanometric unit 20:

$$\theta_y = 0.5 \times \tan^{-1}\left(\frac{Y}{D}\right)$$

$$\theta_x = 0.5 \times \tan^{-1}\left(\frac{X}{d + \frac{D}{\cos\theta_y}}\right)$$

wherein (X, Y) represents the position of the laser beam onto the working surface 3, d represents the distance between the first reflector 182 and the second reflector 202, D represents the distance between the second reflector 202 and the working surface 3, $\theta_x$ represents the first target rotation angle and the origin position of the first reflector 182, and $\theta_y$ represents the second target rotation angle and the origin position of the second reflector 202. The origin position of the first reflector 182 and the origin of the second reflector 202 are 45-degree diagonal coordinates.

It is emphasized that the portable laser engraving/cutting apparatus 1 according to the invention uses a single convex lens for focusing, and does not use an F-theta lens. Therefore, the control program executed in the portable laser engraving/cutting apparatus according to the invention has no need of calibration function for the pincushion distortion. Without the limitation of F-theta lens, the working range of the portable laser engraving/cutting apparatus 1 according to the invention can he enlarged. In one example, the size of the casing 10 of the invention is 50 mm×50 mm×50 mm, the portable laser engraving/cutting apparatus 1 of the invention has the maximum working range of 100 mm×100 mm.

In one embodiment, the first axis galvanometric unit 18 includes a first motor 184. The first motor 184 is operatively connected to the first reflector 182. The second axis galvanometric unit 20 includes a second motor 204. The second motor 204 is operatively connected to the second reflector 202. In principle, the transmission axis of the first motor 184 is perpendicular to the transmission axis of the second motor 204. The first motor 184 and the second motor 204 can respectively be a stepper motor, a voice coil motor or a DC motor, etc.

In one embodiment, as shown in FIG. 6, the controlling circuit 12 includes a micro-processor 120, the first motor controller 121, a second motor controller 122 and a wireless communication module 123. The micro-processor 120 is respectively connected to the working laser source 14, the first motor controller 121, the second motor controller 122, the lens unit 16 and the wireless communication module 123. The first motor controller 121 is electrically connected to the first motor 184. The second motor controller 122 is electrically connected to the second motor 204. The micro-processor 120 is capable of communicating with a mobile data processing apparatus 5 through the wireless communication module 123. The micro-processor 120 selectively receives the information associated with the pattern transmitted from the mobile data processing apparatus 5 through the wireless communication module 123, and respectively transmits a control signal to the working laser source 14, the first motor controller 121, the second motor controller 122 and the lens unit 16 in accordance with the information associated with the pattern. The portable laser engraving/cutting apparatus 1 according to the preferred embodiment of the invention also includes a power supply (not shown in figures) for supplying electric power to all devices of the portable laser engraving/cutting apparatus 1 according to the invention during operation thereof, e.g., a rechargeable battery.

In one embodiment, the wireless communication module 123 can confirm to a Wi-Fi protocol, a WiMAX protocol, IEEE 802.11 series protocols, a 3G network protocol, a 4G network protocol, a 5G network protocol, an FISPA network protocol, an LTE network protocol, a Bluetooth protocol, or other commercial wireless communication protocols.

In one embodiment, the mobile data processing apparatus 5 can be a smart phone, a tablet computer, a notebook computer, etc.

Further, the portable laser engraving/cutting apparatus 1 according to the preferred embodiment of the invention also includes a connection port 124 and a memory card slot 125. The connection port 124 and the memory card slot 125 both are fixed on the casing 10, and respectively electrically connected to the micro-processor 120. For example, as shown in FIG. 7, the opening of the connection port 124 and the opening of the memory card slot 125 both are disposed on a rear panel 108 of the casing 10. In one embodiment, the connection port 124 can be, but not limited to, a USB connection port. The memory card slot 125 can be, but not limited to, an SD memory card slot.

The connection port 124 provides a physical connection for the mobile data processing apparatus 5. The memory card slot 125 receives insertion of a memory card. The micro-processor 120 selectively receives the information associated with the pattern transmitted from the mobile data processing apparatus 5 through the wireless communication module 123 or the connection port 124, or receives the information associated with the pattern stored in the memory card inserted in the memory card slot 125.

In one embodiment, the mobile data processing apparatus 5 executes an application. A user can operate the mobile data processing apparatus 5 to control the micro-processor 120 by use of the application executed in the mobile data processing apparatus 5. The user can operate the application to input files in various formats for engraving or cutting patterns, such as dot matrix file, vector files, or hand drawing files. The user can also operate the application to input the material of the workpiece to be engraved or cut, or the custom parameters. The application can construct the inputted files, material, parameters and so on into a programming language which is tool machine readable, such as G code programing language and so on.

In one embodiment, the first axis galvanometric unit 18 also includes a first magnet 186 fixed on a first transmission axis of the first motor 184. The second axis galvanometric unit 20 also includes a second magnet 206 fixed on a second transmission axis of the second motor 204. The controlling circuit 12 also includes a first Hall device 126 and a second Hall device 127. The first Hall device 126 is electrically connected to the micro-processor 120, and magnetically coupled to the first magnet 186. The second Hall device 127 is electrically connected to the micro-processor 120, and magnetically coupled to the second magnet 206. The first Hall device 126 detects a first magnetic line of the first magnet 186. The second. Hall device 127 detects a second magnetic line of the second magnet 206. The micro-processor 120 transmits the control signal to the first motor controller 121 and the second motor controller 122 in accordance with the first magnetic line detected by the first Hall device 126 and the second magnetic line detected by the second Hall device 127.

Further, also as shown in FIG. 6, the portable laser engraving/cutting apparatus 1 according to the preferred embodiment of the invention also includes an accelerometer 128. The accelerometer 128 is electrically connected to the micro-processor 120, and for detecting a distance of the casing 10. The micro-processor 120 selectively turns off the working laser source 14 in accordance with the distance detected by the accelerometer 128.

Further, also as shown in FIG. 6, the portable laser engraving/cutting apparatus 1 according to the preferred embodiment of the invention also includes a thermal sensor 129. The thermal sensor 129 is electrically connected to the micro-processor 120, and for detecting a temperature inside the casing 10. The micro-processor 120 selectively turns off the working laser source 14 in accordance with the temperature detected by the thermal sensor 129. That is to say, the micro-processor 120 turns of the working laser source 14 when the temperature inside of the casing 10 detected by the thermal sensor 129 is abnormally high.

Further, also as shown in FIG. 6, the portable laser engraving/cutting apparatus 1 according to the preferred embodiment of the invention also includes an electric current sensor 130. The electric current sensor 130 is electrically connected to the micro-processor 120, and for detecting an electric current of the controlling circuit 12. The micro-processor 120 selectively turns off the working laser source 14 in accordance with a current alteration of the electric current detected by the electric current sensor 130. That is to say, the microprocessor 120 turns off the working laser source 14 when the electric current of the controlling circuit 12 detected by the current sensor 130 overloads.

Figure 9:
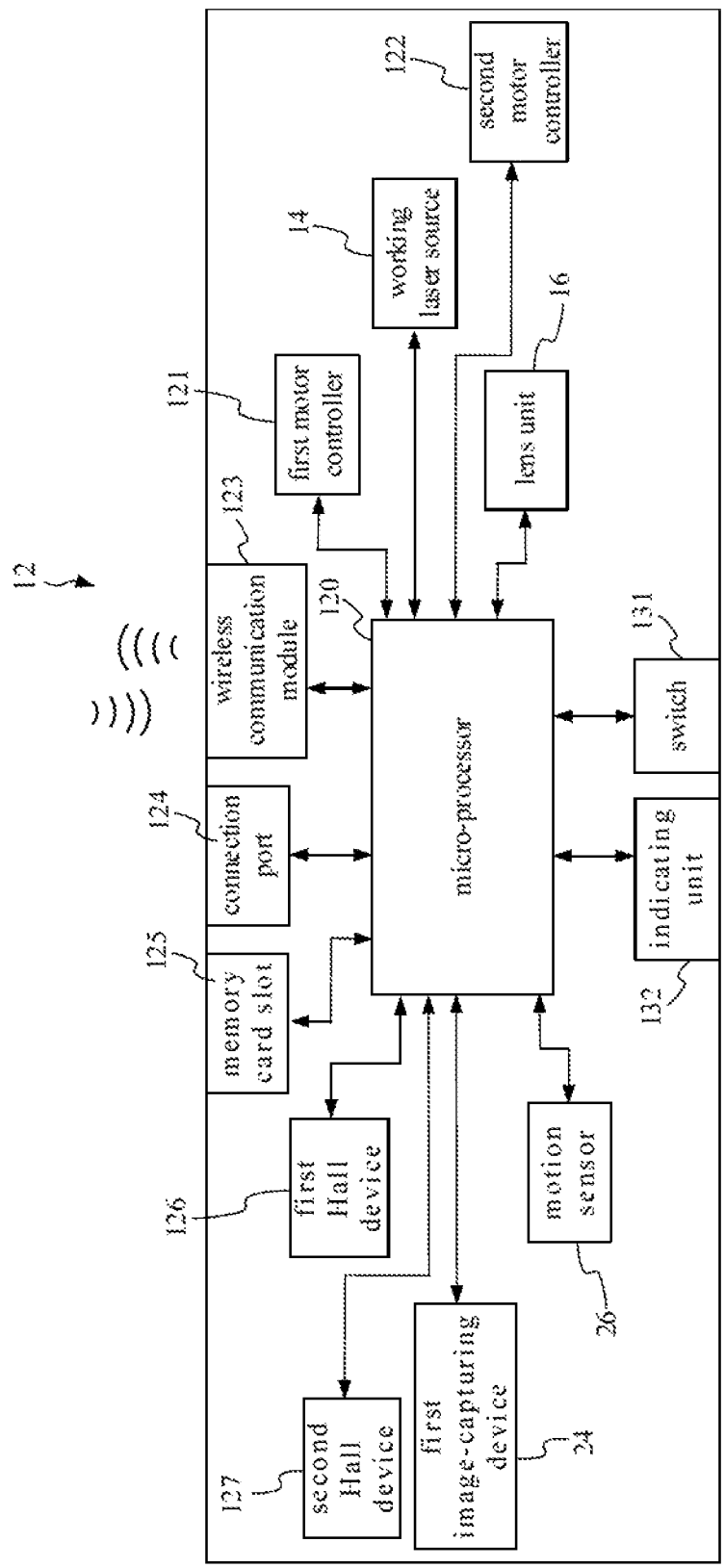
FIG. 9 is another function block diagram of the portable laser engraving/cutting apparatus according to the preferred embodiment of the invention.

Referring to FIG. 9, FIG. 9 is another function block diagram of the portable laser engraving/cutting apparatus 1 according to the preferred embodiment of the invention. Further, as shown in FIG. 9, the portable laser engraving/cutting apparatus 1 according to the preferred embodiment of the invention also includes a first image-capturing device 24. The first image-capturing device 24 is electrically connected to the micro-processor 120, and for capturing an image in front of the front panel 102. The micro-processor 120 selectively turns off the working laser source 14 in accordance with an alteration of the image captured by the first image-capturing device 24. In one embodiment, the first image-capturing device 24 is disposed on the front panel 102. The components, members and devices in FIG. 9 identical to those shown in FIG. 6 are given the same numerical notations, and will be not described in detail herein.

Further, also as shown in FIG. 9, the portable laser engraving/cutting apparatus 1 according to the preferred embodiment of the invention also includes a motion sensor 26. The motion sensor 26 is electrically connected to the micro-processor 120, and for detecting a distance associated with an object locating between the window 1022 and the working surface 3. The micro-processor 120 selectively turns off the working laser source 14 in accordance with the distance detected by the motion sensor 26. In one embodiment, the motion sensor 26 is disposed on the front panel 102.

In practical application, the motion sensor 26 can be one of active motion sensors, i.e., motion sensors being capable of irradiating energy and including: motion sensors capable of irradiating microwave, motion sensors capable of irradiating ultrasound, radar-type motion sensors, lidar-type motion sensors, etc. The motion sensor 26 can also use one of passive mobile sensors, which includes the image-capturing devices, passive infrared sensors, etc.

Figure 10:
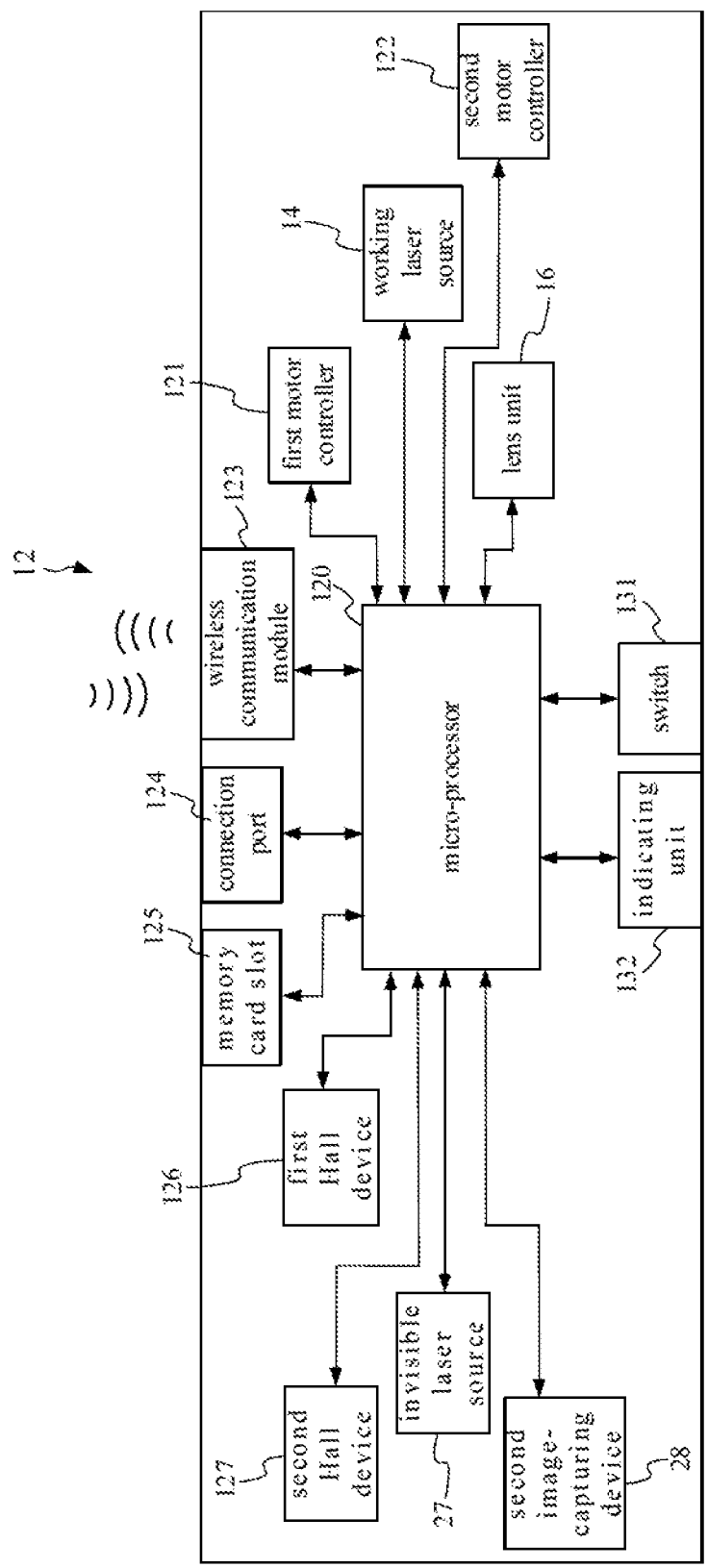
FIG. 10 is another function block diagram of the portable laser engraving/cutting apparatus according to the preferred embodiment of the invention.

Referring to FIG. 10, FIG. 10 is another function block diagram of the portable laser engraving/cutting apparatus 1 according to the preferred embodiment of the invention. Further, as shown in FIG. 10, the portable laser engraving/cutting apparatus 1 according to the preferred embodiment of the invention also includes an invisible laser source 27 and a second image-capturing device 28. The invisible laser source 27 and the second image-capturing device 28 are respectively electrically connected to the micro-processor 120. The invisible laser source 27 is for emitting an invisible light structure to project onto the working surface 3. The second image-capturing device 28 is for capturing the invisible light structure projected on the working surface 3. The micro-processor 120 selectively turns off the working laser source 14 in accordance with an alteration of the invisible light structure captured by the second image-capturing device 28. In one embodiment, the invisible laser source 27 and the second image-capturing device 28 are disposed on the front panel 102. The components, members and devices in FIG. 10 identical to those shown in FIG. 6 are given the same numerical notations, and will be not described in detail herein.

Further, as shown in FIG. 1 and FIG. 6, the portable laser engraving/cutting apparatus 1 according to the preferred embodiment of the invention also includes a switch 131 and an indicating unit 132. The switch 131 and the indicating unit 132 are disposed on a top 104 of the casing 10, and respectively electrically connected to the micro-processor 120. The user can operate the switch 131 to turn on or off the portable laser engraving/cutting apparatus 1. The micro-processor 120 controls the indicating unit 132 to emit a color light in accordance with turning on or off of the switch 131. For example, the indicating unit 132 emits a white light representative of turning-on state of the portable laser engraving/cutting apparatus 1 according to the invention. The indicating unit 132 emits a red light representing that the working laser source 14 is emitting the laser beam.

In one embodiment, as shown in FIG. 1 and FIG. 7, the casing 10 has a screw hole 1062 formed at a bottom 106 thereof. The screw hole 1062 provides screwing for a foot shelf 4.

With detailed description of the invention above, it is clear that the portable laser engraving/cutting apparatus according to the invention is small in volume to be carried easily. The portable laser engraving/cutting apparatus according to the invention can maintain high power output without the need of fan cooling. It is slightly difficult for aligning the center of the portable laser engraving/cutting apparatus according to the invention during assembly. The portable laser engraving/cutting apparatus according to the invention has low distortion in laser scanning. Moreover, the portable laser engraving/cutting apparatus according to the invention has no limitation on working range and direction, and can process the working surface of the workpiece in any direction. The portable laser engraving/cutting apparatus according to the invention can preview the working path to provide convenience for general users using the portable laser engraving/cutting apparatus according to the invention.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A portable laser engraving/cutting apparatus for engraving or cutting a pattern on a working surface of a workpiece, said portable laser engraving/cutting apparatus comprising:
   a casing, comprising a front panel having a window and an inner wall;
   a controlling circuit, being fixed in the casing and being for receiving an information associated with the pattern;
   a working laser source, being fixed on the inner wall of the front panel and electrically connected to the controlling circuit, the working laser source being controlled by the controlling circuit to emit a laser beam;
   a first axis galvanometric unit, being fixed on the inner wall of the front panel and electrically connected to the controlling circuit, the first axis galvanometric unit comprising a first reflector;
   a lens unit, being fixed on the inner wall of the front panel and electrically connected to the controlling circuit, the lens unit being capable of moving with respect to the working laser source or moving together with the working laser source with respect to the first axis galvanometric unit; and
   a second axis galvanometric unit, being fixed on the inner wall of the front panel and electrically connected to the controlling circuit, the second axis galvanometric unit comprising a second reflector;
   wherein the controlling circuit adjusts, according to the information associated with the pattern, a distance of the lens unit with respect to the working laser source or the first axis galvanometric unit, adjust a first target rotation angle of the first reflector and a second target rotation angle of the second reflector to control a position and an energy of the laser beam passing through the window and onto the working surface.

2. The portable laser engraving/cutting apparatus of claim 1, wherein the controlling circuit also adjusts, according to the following function, the first target rotation angle of the first reflector and the second target rotation angle of the second reflector to reduce a pincushion distortion caused by the first axis galvanometric unit and the second axis galvanometric unit:

$$\theta_y = 0.5 \times \tan^{-1}\left(\frac{Y}{D}\right)$$

$$\theta_x = 0.5 \times \tan^{-1}\left(\frac{X}{d + \frac{D}{\cos\theta_y}}\right)$$

wherein (X, Y) represents the position of the laser beam onto the working surface, d represents the distance between the first reflector and the second reflector, D represents the distance between the second reflector and the working surface, $\theta_x$ represents the first target rotation angle and the origin position of the first reflector, and $\theta_y$ represents the second target rotation angle and the origin position of the second reflector.

3. The portable laser engraving/cutting apparatus of claim 2, wherein the first axis galvanometric unit comprises a first motor, the first motor is operatively connected to the first reflector, the second axis galvanometric unit comprises a second motor, the second motor is operatively connected to the second reflector.

4. The portable laser engraving/cutting apparatus of claim 3, wherein the controlling circuit comprises a micro-processor, the first motor controller, a second motor controller and a wireless communication module, the micro-processor is respectively connected to the working laser source, the first motor controller, the second motor controller, the lens unit and the wireless communication module, the first motor controller is electrically connected to the first motor, the second motor controller is electrically connected to the second motor, the micro-processor is capable of communicating with a mobile data processing apparatus through the wireless communication module, the micro-processor selectively receives the information associated with the pattern transmitted from the mobile data processing apparatus through the wireless communication module, and respectively transmits a control signal to the working laser source, the first motor controller, the second motor controller and the lens unit in accordance with the information associated with the pattern.

5. The portable laser engraving/cutting apparatus of claim 4, wherein the wireless communication module confirms to one selected from the group consisting of a Wi-Fi protocol, a WiMAX protocol, IEEE 802.11 series protocols, a 3G network protocol, a 4G network protocol, a 5G network protocol, an HSPA network protocol, an LTE network protocol, and a Bluetooth protocol.

6. The portable laser engraving/cutting apparatus of claim 4, further comprising a connection port and a memory card slot, both being fixed on the casing and respectively electrically connected to the micro-processor, the connection port providing a physical connection for the mobile data processing apparatus, the memory card slot receiving insertion of a memory card, wherein the micro-processor selectively receives the information associated with the pattern transmitted from the mobile data processing apparatus through the wireless communication module or the connection port, or receives the information associated with the pattern stored in the memory card inserted in the memory card slot.

7. The portable laser engraving/cutting apparatus of claim 6, wherein the mobile data processing apparatus executes an application, a user operates the mobile data processing apparatus to control the micro-processor by use of the application.

8. The portable laser engraving/cutting apparatus of claim 4, wherein the first axis galvanometric unit also comprises a first magnet fixed on a first transmission axis of the first motor, the second axis galvanometric unit also comprises a second magnet fixed on a second transmission axis of the second motor, the controlling circuit also comprises a first Hall device and a second Hall device, the first Hall device is electrically connected to the micro-processor and magnetically coupled to the first magnet, the second Hall device is electrically connected to the micro-processor and magnetically coupled to the second magnet, the first Hall device detects a first magnetic line of the first magnet, the second Hall device detects a second magnetic line of the second magnet, the micro-processor transmits the control signal to the first motor controller and the second motor controller in accordance with the first magnetic line detected by the first Hall device and the second magnetic line detected by the second Hall device.

9. The portable laser engraving/cutting apparatus of claim 4, further comprising an accelerometer, electrically connected to the micro-processor, for detecting a distance of the casing, wherein the micro-processor selectively turns off the working laser source in accordance with the distance detected by the accelerometer.

10. The portable laser engraving/cutting apparatus of claim 4, further comprising a thermal sensor, electrically connected to the micro-processor, for detecting a temperature inside the casing, wherein the micro-processor selectively turns off the working laser source in accordance with the temperature detected by the thermal sensor.

11. The portable laser engraving/cutting apparatus of claim 4, further comprising an electric current sensor, electrically connected to the micro-processor, for detecting an electric current of the controlling circuit, wherein the micro-processor selectively turns off the working laser source in accordance with a current alteration of the electric current detected by the electric current sensor.

12. The portable laser engraving/cutting apparatus of claim 4, further comprising a first image-capturing device, electrically connected to the micro-processor, for capturing an image in front of the front panel, wherein the micro-processor selectively turns off the working laser source in accordance with an alteration of the image captured by the first image-capturing device.

13. The portable laser engraving/cutting apparatus of claim 4, further comprising a motion sensor, electrically connected to the micro-processor, for detecting a distance associated with an object locating between the window and the working surface, wherein the micro-processor selectively turns off the working laser source in accordance with the distance detected by the motion sensor.

14. The portable laser engraving/cutting apparatus of claim 4, further comprising an invisible laser source and a second image-capturing device, respectively electrically connected to the micro-processor, the invisible laser source being for emitting an invisible light structure to project onto the working surface, the second image-capturing device being for capturing the invisible light structure projected on the working surface, wherein the micro-processor selectively turns off the working laser source in accordance with an alteration of the invisible light structure captured by the second image-capturing device.

15. The portable laser engraving/cutting apparatus of claim 4, further comprising a switch and an indicating unit, disposed on a top of the casing and respectively electrically connected to the micro-processor, wherein a user operates the switch to turn on or off said portable laser engraving/cutting apparatus, the micro-processor controls the indicating unit to emit a color light in accordance with turning on or off of the switch.

16. The portable laser engraving/cutting apparatus of claim 4, wherein the casing has a screw hole formed at a bottom thereof, the screw hole provides screwing for a foot shelf.

* * * * *